United States Patent Office 3,179,547
Patented Apr. 20, 1965

3,179,547
METHOD OF EFFECTING THE ADHESION OF POLYESTER MATERIALS TO RUBBERS
Koji Kigane, Haruo Togawa, and Shinichi Yamada, all of Iwakuni-shi, Yamaguchi-ken, Japan, assignors to Teikoku Jinzo Kenshi Kabushiki Kaisha, Osaka, Japan, a corporation of Japan
No Drawing. Filed Oct. 24, 1961, Ser. No. 147,166
11 Claims. (Cl. 156—315)

This invention relates to a method of improving the adhesion of polyester materials, particularly polyester textile materials to a rubber compound. More particularly, the invention relates to an improved method for effecting the adhesion to rubbers of polyester materials containing high molecular weight polyesters, such materials including filaments, fibers, yarns, strands, cords, cord-fabrics, films and the like.

The polyesters as used in the invention are the high molecular weight polyesters obtained from $\alpha,\omega$-glycols and dicarboxylic acids, particularly any one of the high molecular weight polyesters obtained from polymethylene glycols and the aromatic dicarboxylic acids. As the most typical of these can be cited polyethylene terephthalate which is obtained from ethylene glycol and terephthalic acid.

Among the rubber compounds as used in the invention are polymers of isoprene such as natural rubbers; polymers of butadiene such as polybutadiene, a butadiene-styrene copolymer and a butadiene-acrylonitrile copolymer; polymers of chloroprene such as Neoprene; and the like rubbery material.

Polyester fibers possess properties most desirable as reinforcing materials for rubbers, such as excellent tensile strength, shock resistance, stretch resistance, dimensional stability, heat resistance, chemical resistance, imperviousness to water, bacterial resistance and weatherability. However, due to the fact that their molecular structure is inactive, an adhesion force necessary for their practical application could not be obtained by the conventional adhesion treatments.

Namely, the adhesives such as, for example, the vinylpyridine copolymer latex-resorcinol-formaldehyde aqueous dispersion which has been proved heretofore to be commercially valuable in the adhesion of cellulosic textiles to rubbers does not give satisfactory results in case of the adhesion of polyester textiles to rubbers.

In view of the above many proposals have been made as to the methods of effecting the adhesion of polyester textile materials to rubbers, the principal ones being:

(1) The isocyanate method;
(2) The ethylene urea method;
(3) The water-stable isocyanate method; etc.

However, all of these have shortcomings as described below, and thus none are fully satisfactory.

The method listed as (1), above, is that in which polyester textiles are treated with a treatment liquor wherein has been dissolved or dispersed isocyanates, after which the polyester textiles are adhered to rubbers. However, according to this method there is required a large quantity of isocyanate, thus raising the cost. Moreover there is the matter of toxicity, and in addition its adhesive force is not sufficient.

In the method listed as (2), above, the polyester textiles are treated with a treatment liquor in which ethylene urea has been dissolved or dispersed, after which they are adhered to rubbers. In this case also, ethylene urea is required in large quantities so as to make the process expensive, and in addition the adhesive force obtained is not sufficient for practical use.

In the method of (3), above, the polyester textiles are treated with an aqueous dispersion of water-stable isocyanate and latex, following which they are adhered to rubbers. This method is also unsatisfactory in that not only is it uneconomical because of the requirement for a large quantity of water-stable isocyanate, but also because by this single stage treatment adhesive force sufficient for practical applications is not obtainable.

A primary object of the invention is to provide a method of effecting the adhesion to rubbers of high molecular weight polyester-containing materials, particularly polyester textile materials.

Another object of the invention is to provide, in the adhesion of polyester materials to rubbers with a phenol-formaldehyde-latex aqueous dispersion, a method of forming prior to their adhesion an effective first coating upon these materials for enhancing the adhesiveness thereof.

A still further object of the invention is to provide, in the adhesion to rubbers of high molecular weight polyester-containing materials, particularly polyester textile materials, a method of imparting adhesion having high adhesive force and high breaking ratio at the H-piece test.

A particular object of the invention is to provide a method of effecting the adhesion to rubbers of materials containing polyethylene terephthalate, particularly polyethylene terephthalate textile materials.

A further object of the invention is to provide an improved method of effecting the adhesion to rubbers of textile materials obtained from polyethylene terephthalate for reinforcing articles made of rubbers.

Other objects and advantages of the invention will become apparent from the following detailed description thereof and the appended claims.

The improved method according to the invention of the adhesion of a polyester material to a rubber compound comprises the steps of treating said material with a first treatment liquor, preferably an aqueous first treatment liquor, containing a functional compound selected from the class consisting of compounds having at least two ethylene urea groups and compounds having at least two ethylene urethane groups, heat-treating at temperatures between 150 and 250° C., preferably between 180 and 230° C., the material treated with the first treatment liquor, treating the heat-treated material with a second treatment liquor comprising a phenol-formaldehyde-latex aqueous dispersion, heat-treating at temperatures between 100 and 250° C. the material treated with the second treatment liquor, and thereafter effecting the adhesion of the material to the rubber compound.

As described hereinabove, the first treatment liquor used in the invention contains a compound having at least two ethylene urea groups or at least two ethylene urethane groups.

The following are examples of the foregoing compound that is used in the first treatment liquor.

Compounds having ethylene urea groups of the formula

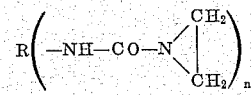

wherein R is a polyvalent organic radical free from active hydrogen, and $n$ is an integer of at least 2:

(1) Polymethylenebis(ethylene urea), e.g.
  Tetramethylenebis(ethylene urea)
  Hexamethylenebis(ethylene urea)
  Octamethylenebis(ethylene urea)
  Nonamethylenebis(ethylene urea)
  Decamethylenebis(ethylene urea)
  Undecamethylenebis(ethylene urea)
  Dodecamethylenebis(ethylene urea)

(2) 3-thiapentamethylenebis(ethylene urea)
(3) 4-thiaheptamethylenebis(ethylene urea)
(4) 7-thiatridecamethylenebis(ethylene urea)
(5) 3-oxapentamethylenebis(ethylene urea)
(6) 3,6-dioxaoctamethylenebis(ethylene urea)
(7) 3,6,9-trioxaundecamethylenebis(ethylene urea)
(8) 4-oxaheptamethylenebis(ethylene urea)
(9) 4,8-dioxaundecamethylenebis(ethylene urea)
(10) Cyclohexylene-1,4-bis(ethylene urea)
(11) Cyclohexylene-1,3-bis(ethylene urea)
(12) Phenylene-1,4-bis(ethylene urea)
(13) Phenylene-1,3-bis(ethylene urea)
(14) Alkylphenylene-2,4-bis(ethylene urea)
(15) Alkylphenylene-2,6-bis(ethylene urea)
(16) Alkylphenylene-2,5-bis(ethylene urea)
(17) Alkylphenylene-3,5-bis(ethylene urea)
(18) 1,3-dimethylphenylene-2,4-bis(ethylene urea)
(19) 1,3-dimethylphenylene-4,6-bis(ethylene urea)
(20) 1,4-dimethylphenylene-2,5-bis(ethylene urea)
(21) Alkoxyphenylene-2,4-bis(ethylene urea)
(22) Chlorophenylene-2,4-bis(ethylene urea)
(23) Phenoxyphenylene-2,4-bis(ethylene urea)
(24) Nitrophenylene-2,4-bis(ethylene urea)
(25) Methylenebis(cyclohexylene 4-ethylene urea)
(26) Methylenebis(3-methylcyclohexylene 4-ethylene urea)
(27) Methylenebis(phenylene 4-ethylene urea)
(28) Methylenebis(3-methylphenylene 4-ethylene urea)
(29) Methylenebis(3-methoxyphenylene 4-ethylene urea)
(30) Methylenebis(2,5-dimethylphenylene 4-ethylene urea)
(31) Propylidene-2,2-bis(phenylene 4-ethylene urea)
(32) Propylidene-2,2-bis(cyclohexylene 4-ethylene urea)
(33) Ethylenebis(phenylene 4-ethylene urea)
(34) 1,3-dimethylphenylene-4,6-bis(dimethylene ethylene urea)
(35) Naphthylene-1,5-bis(ethylene urea)
(36) Naphthylene-1,4-bis(ethylene urea)
(37) Biphenylylene-4,4'-bis(ethylene urea)
(38) 3,3'-dimethylbiphenylylene-4,4'-bis(ethylene urea)
(39) 3,3'-dimethoxybiphenylylene-4,4'-bis(ethylene urea)
(40) Furanylene-2,5-bis(dimethylene ethylene urea)
(41) Tetrahydrofuranylene-2,5-bis(dimethylene ethylene urea)
(42) Thiophenylene-2,5-bis(dimethylene ethylene urea)
(43) Ethylidenephenyl-3,1'-bis(ethylene urea)
(44) Cyclohexylene-1,3-bis(methylene ethylene urea)
(45) Cyclohexylene-1,4-bis(methylene ethylene urea)
(46) Phenylene-1,3-bis(methylene ethylene urea)
(47) Phenylene-1,4-bis(methylene ethylene urea)
(48) Naphthylene-1,4-bis(methylene ethylene urea)
(49) Naphthylene-1,5-bis(methylene ethylene urea)
(50) Phenylene-1,4-bis(dimethylene ethylene urea)
(51) 1,3-diaza-2,4-dioxocyclobutylene-1,3-bis(4'-methylphenylene 3'-ethylene urea)
(52) 1,3-diaza-2,4-dioxocyclobutylene-1,3-bis(4'-chlorophenylene 3'-ethylene urea)
(53) 1,3-diaza-2,4-dioxocyclobutylene-1,3-bis(4'-methoxyphenylene 3'-ethylene urea)
(54) 1,3-diaza-2,4-dioxocyclobutylene-1,3-bis(4'-phenoxyphenylene 3'-ethylene urea)
(55) 1,3-diaza-2,4-dioxocyclobutylene-1,3-bis(p-phenylene-2'-methylpropyl 2'-ethylene urea)
(56) Phenylene-1,2-bis(oxycarboamino-4'-methylphenyl 3'-ethylene urea)
(57) Methylidynetris(phenylene 4-ethylene urea)
(58) Biphenylylyne-2,4,4'-tris(ethylene urea)
(59) Benzylylenephenyl-2,4,4'-tris(ethylene urea)
(60) 3-methylenepentylene-2,4,4'-tris(oxycarboamino-4'-methylphenyl 3'-ethylene urea)
(61) Propylidynetris(methyleneoxycarboamino-4'-methylphenyl 3'-ethylene urea)
(62) 3-methylenepentylene-2,4-tris(oxycarboaminohexyl ethylene urea)
(63) Propylidynetris(methyleneoxycarboaminohexyl ethylene urea)

Compounds having ethylene urethane groups of the formula

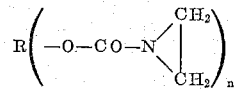

wherein R is a polyvalent organic radical free from active hydrogen, and $n$ is an integer of at least 2:

(1) Polymethylenebis(ethylene urethane), e.g.
   Tetramethylenebis(ethylene urethane)
   Hexamethylenebis(ethylene urethane)
   Octamethylenebis(ethylene urethane)
   Decamethylenebis(ethylene urethane)
   Undecamethylenebis(ethylene urethane)
   Dodecamethylenebis(ethylene urethane)
(2) 3-thiapentamethylenebis(ethylene urethane)
(3) 4-thiaheptamethylenebis(ethylene urethane)
(4) 7-thiatridecamethylenebis(ethylene urethane)
(5) 3-oxapentamethylenebis(ethylene urethane)
(6) 3,6-dioxaoctamethylenebis(ethylene urethane)
(7) 3,6,9-trioxaundecamethylenebis(ethylene urethane)
(8) 4-oxaheptamethylenebis(ethylene urethane)
(9) 4,8-dioxaundecomethylenebis(ethylene urethane)
(10) Cyclohexylene-1,4-bis(ethylene urethane)
(11) Cyclohexylene-1,3-bis(ethylene urethane)
(12) Phenylene-1,4-bis(ethylene urethane)
(13) Phenylene-1,3-bis(ethylene urethane)
(14) Alkylphenylene-2,4-bis(ethylene urethane)
(15) Alkylphenylene-2,6-bis(ethylene urethane)
(16) Alkylphenylene-2,5-bis(ethylene urethane)
(17) Alkylphenylene-3,5-bis(ethylene urethane)
(18) 1,3-dimethylphenylene-2,4-bis(ethylene urethane)
(19) 1,3-dimethylphenylene-4,6-bis(ethylene urethane)
(20) 1,4-dimethylphenylene-2,5-bis(ethylene urethane)
(21) Chlorophenylene-2,4-bis(ethylene urethane)
(22) Nitrophenylene-2,4-bis(ethylene urethane)
(23) Methylenebis(cyclohexylene 4-ethylene urethane)
(24) Methylenebis(phenylene 4-ethylene urethane)
(25) Methylenebis(3-methylphenylene 4-ethylene urethane)
(26) Methylenebis(2,5-dimethylphenylene 4-ethylene urethane)
(27) Propylidene-2,2-bis(phenylene 4-ethylene urethane)
(28) Propylidene-2,2-bis(cyclohexylene 4-ethylene urethane)
(29) Ethylenebis(phenylene 4-ethylene urethane)
(30) 1,3-dimethylphenylene-4,6-bis(dimethylene ethylene urethane)
(31) Naphthylene-1,5-bis(ethylene urethane)
(32) Naphthylene-1,4-bis(ethylene urethane)
(33) Biphenylylene-4,4'-bis(ethylene urethane)
(34) 3,3'-dimethylbiphenylylene-4,4'-bis(ethylene urethane)
(35) Furanylene-2,5-bis(dimethylene ethylene urethane)
(36) Tetrahydrofuranylene-2,5-bis(dimethylene ethylene urethane)
(37) Thiophenylene-2,5-bis(dimethylene ethylene urethane)
(38) Ethylidenephenyl-3,1'-bis(ethylene urethane)

The first treatment liquor may be either a solution, a dispersion, or an emulsion. An aqueous emulsion or disperson is of advantage.

The first treatment liquor may also be an organic liquor. The organic solvent used in said organic liquor may be any so far as the same does not react with the compound dissolved, dispersed or emulsified therein.

Those organic solvents suitable for the invention include: the aliphatic hydrocarbons such as heptane and octane, aromatic hydrocarbons such as benzene and toluene, alcohols such as ethanol and propanol, ethers such as butyl ether, dioxane and tetrahydrofuran, ketones such as acetone and 2-butanone, esters such as ethyl acetate and butyl acetate, halogenated hydrocarbons such as dichloromethane and dichloroethane, nitro compounds such as nitromethane and nitroethane, nitriles such as acetonitrile and propionitrile, amines such as propylamine and butylamine, amides such as formamide and dimethylformamide, and sulfur compounds such as carbon disulfide and ethyl sulfide.

The addition to the first treatment liquor of a small quantity of a compound having an amine group is desirable. For by doing so, not only can the time necessary for heating the material that has been treated with the first treatment liquor and forming thereon of the first coating be shortened, but also it is effective in forming a uniform and compact first coating of resin film. Also, the addition of the amines manifests effects such as an improvement in the flexibility of the treated material after having been given the second coating as well as an increase in its final adhesive force.

Compounds having an amine group which can be used for this purpose are those such as the primary, secondary and tertiary amines, polymerized amino compounds and the quaternary hydroxylammonium compounds.

The amino compounds especially desirable for use in the invention include the aliphatic diamines such as ethylene diamine, trimethylene diamine, tetramethylene diamine, pentamethylene diamine, hexamethylene diamine, heptamethylene diamine, octamethylene diamine and nonamethylene diamine; the polymerized aliphatic polyamines such as triethylene diamine, tetraethylene triamine, etc.; the aromatic amines such as aniline, N-methyl aniline, N,N-dimethyl aniline, diamino benzene, etc.; the cycloaliphatic amines such as piperidine; the heterocylic amines such as pyridine; and also other compounds such as urea, thiourea, diphenyl urea and diphenyl thiourea.

The amino compound may be added to the first treatment liquor containing a compound of the formula

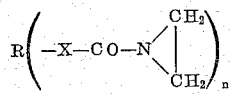

wherein X is selected from the group consitsing of NH and O; R is a polyvalent organic radical free from active hydrogen; and $n$ is an integer of at least 2, desirably in an amount that ranges within 0.05–4 equivalents of the amino group to each equivalent of said compound. However, in most cases, 0.5–1.2 equivalents is particularly suitable.

The first treatment liquor as used in method of the invention may also contaian small quantities of other suitable additives such as follows:

(1) A dispersing agent such as Aerosol OT (a product of American Cyanamid Co.) for dispersing the effective compound in water or an organic solvent.

(2) An emulsifier such as polyvinyl alcohol (PVA), carboxyl methyl cellulose (CMC) or sodium alginate when emulsifying the effective compound in water or an organic solvent.

(3) Unvulcanized rubber latex, vinylpyridine copolymer latex or raw rubber organic solutions for imparting flexibility to the polyester materials to which have been applied the first coating. The additives of (2) and (3), above, serve also as the viscosity controlling agent of the first treatment liquor. Namely, by giving to the first treatment liquor a suitable viscosity, for use they have the action of controlling the pick up of the first treatment liquor by polyester materials.

Treatment of the polyester materials with the first treatment liquor and the second treatment liquor may be by any suitable method. While the treatment liquors may be applied to the material to be treated by means of a sprayer or by brush, it is generally preferred to immerse the polyester material, with or without tension, in the treatment liquor and remove it therefrom with a suitable prescribed pick up.

The solid pick up of the first coating formed on the surface of the polyester material according to the invention increases linearly as the concentration of the compound having the selected functional group in the first treatment liquor increases. However, while the adhesive force of the polyester material to rubbers increases up to a certain extent proportionally as an increase in the solid pick up occurs, beyond that the increase of the adhesive force becomes slow, indicating that a critical point exists. This fact teaches that so long as the first coating is a dense and uniform resin film and covers the whole of the surface of the polyester material to which adhesion is to be made, it is sufficient even though it may be a very thin film; and any pick up of resin in excess of that is of no use in bringing about a further increase of the adhesive force. A pick up in excessive amounts of the resin film of the first coating must be avoided, for it not only results in increasing costs but also undesirable tendencies are noted, such as a decrease in the resistance to the various fatigues to which the product obtained after adhesion to rubbers is subjected, and the manifestation of water repellency which hinders the desirable uniform pick up of the second treatment liquor.

Generally in the adhesion of polyester materials to rubbers, the optimum quantity of resin pick up that will give the maximum adhesive force will vary depending upon the uses to which the intended product is to be put and the form of the polyester material. Moreover, with there being instances, depending upon its use, in which a maximum adhesive force is not necessarily required, in practicing the method of the invention it is preferred that, in accordance with the uses to which the intended articles are to be put and the form of the polyester materials used, treataments commensurate with the ends to be achieved to be given, with an awareness of the optimum quantity of the resin pick up for the first coating, i.e., by selection of the concentration in the first treatment liquor of the compound having the effective functional groups and the pick up of said liquor. Namely, the approximate values are as follows: in case of a cable cord, 0.1–8%, preferably 0.5–5%, in case of a tire cord, 0.2–8%, preferably 1–5% and in case of thickly woven materials for conveyor belts, 1–15%, preferably 3–10%.

The polyester materials that have been treated with the first treaatment liquor, as hereinabove described, must then be heated at temperatures between 150–250° C., preferably 180–230° C. This heat is an indispensable condition for firmly bonding to the surface of the polyester material being treated a compound of the formula

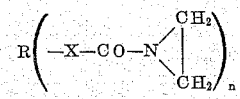

wherein X is selected from the group consisting of NH and O; R is a polyvalent organic radical free from active hydrogen; and $n$ is an integer of at least 2, and phenyl urethane group which compound is contained in the first treatment liquor that has been picked up by the surface of the polyester material, and for forming a first coating comprising a nitrogen-containing cohesive high polymer that is also crosslinkable with the second coating to be obtained by the second treatment liquor. At a heating temperature less than 150° C. the formation of the first coating is not adequate and the adhesive force obtained is small, thus the objective of the present invention not being attained. On the other hand, if the treatment is effected at a heating temperature above 250° C., the polyester materials used tend to become deleteriously affected.

In the manufacture of tire cords heat setting of the cords under tension is usually practiced for the purpose of lessening the tendency of the cords to stretch under loads or to shrink during the vulcanizing process of rubber. According to the present invention, the heat treatment given for forming the first coating fortunately can also serve at the same time for heat setting the cord itself. Furthermore, particularly in case the material being treated happens to be polyethylene terephthalate, if this heat setting and the heat treatment for forming the first coating are performed together under a tension permitting the shrinkage of the cord, the performance characteristics of the tire is markedly improved.

The polyester materials to which is imparted the first coating according to the method of the invention, as intermediate products, possess full stability as will not impair their marketable value. The polyester materials having this first coating, even when left exposed to the air for a long number of hours were not affected by humidity, oxygen or sunlight, nor was there observed any change at all in the final adhesive force that they had acquired. In the examples of the invention there is given an instance of a cord having a first coating which was put to satisfactory use even after being left standing in a room for a one-year period. If desired, the polyester fibers having the first coating can also be woven, and thereafter the fabric so obtained can be adhered to rubbers by treating as described hereinafter.

The polyester material which has already been given the first coating is treated in the conventional manner with the second treatment liquor comprising a phenol-formaldehyde-latex aqueous dispersion and thereafter baked at temperatures between 100–250° C. whereby the second coating is formed thereon. The phenol-formaldehyde-latex aqueous dispersions used as the second treatment liquor in the invention may be any of those adhesives that are usually used in the adhesion of textile materials to rubbers. While the phenol may be selected from phenol, resorcinol, catechol and the other phenols, resorcinol is especially suitable. As the latex, while any of the latices known in the trade as adhesives for the adhesion of textile materials to rubbers may be used, the vinyl-pyridene copolymer latex such as the "Gentac" brand latex of the General Tire and Rubber Company and other latices having as their base polyvinyl-pyridene or the mixtures of these and natural rubber latex are to be preferred.

In effecting the adhesion to rubbers of the polyester materials on which the second coating has been formed, the matter of changes occurring because of lapse of time has no effects needing consideration in commercial scale production. Even after a lapse of two weeks, hardly any decrease was observed in the adhesive force finally obtained.

The polyester materials to which have been imparted the first and second coatings are adhered to rubbers, generally by a treatment resembling vulcanization. Namely, the polyester materials to which have been imparted the two coatings are heated together with rubbers. If desired, this heating may be done under pressure.

The precise mechanism of the adhesion of polyester materials to rubbers by the method of this invention is not exactly clear. However, an hypothesis may be drawn from the following facts: (1) the adhesive force depends on the solid pick up of the first coating; (2) the temperature at which the first coating is heat treated is an important requisite for attaining the objectives of the invention; (3) the effects of the addition of amino compounds are clearly noticeable; and (4) the first coating by means of heat treatment becomes insoluble as well as unmeltable thereby rendering it difficult to remove by solvent or by mechanical means. It is hypothesized that the compound having the functional groups which has been heated is heat activated and not only reacts with the —OH terminal group or the —COOH terminal group of the polyester molecule to form a strong covalent bond but also by addition or condensation homopolymerization it becomes a nitrogen-containing cohesive high polymer having a strong molecular cohesive force, thereby finally forming on the surface of the polyester materials a firmly adhered first coating by means of a covalent bond, a highly dense hydrogen bond, or by Van der Waals forces, with the polyester materials.

However, satisfactory adhesiveness is not manifested with only the first coating that has been formed on the surface of the polyester material. On the other hand, if polyester materials are adhered directly to rubbers with the intervention of a phenol-formaldehyde-latex aqueous dispersion having adhesiveness with respect to rubbers, since said aqueous dispersion or the heat-dried film of said aqueous dispersion possesses hardly any bondability with respect to polyester materials, adequate adhesive effects cannot be obtained.

However, according to the method of this invention the polyester materials to be treated are first given a strongly bonded first coating thereon by treating with the first treatment liquor and the first heating step, and since this first coating is adhesive with respect to the second coating obtained by heat drying thereon a phenol-formaldehyde-latex aqueous dispersion, the polyester materials are adhered to rubbers through the intervention of this second coating. The fact that the adhesive force of the adhesion of polyester materials to rubbers according to the method of this invention is highly satisfactory is explicable by the hereinabove-described adhesion mechanism.

The following examples illustrate the nature of the invention but are not intended to limit it in any manner except as it is limited in the appended claims. In the examples all parts are by weight, unless otherwise indicated.

The tire cord used in part of the following Examples 1–12 is that of about 2200 deniers having a structure of 51S x 51Z t./m. (twists per meter) which has been obtained by spinning 48 filaments of polyethylene terephthalate into a yarn, drawing this yarn to make it into 250 deniers, taking four lengths of this yarn and imparting an undertwist in the Z-direction, followed by imparting an upper twist in the S-direction to two of the four undertwisted lengths.

Similarly, the cable cord is that of about 20,000 deniers having a structure of 8.0Z x 13.0S t./m. which has been obtained by imparting an undertwist in the S-direction to 25 lengths of a yarn spun from 48 filaments of polyethylene terephthalate and of 250 deniers, followed by imparting an upper twist in the Z-direction to three of the undertwisted lengths.

In the treatments for imparting the first and second coatings to the cord, the Computreater produced by C. A. Litzler Co., Inc., Cleveland 9, Ohio, U.S.A., was employed.

*Example 1*

In 90 parts of water adjusted to pH 9.0 with sodium hydroxide was dispersed 3 parts of hexamethylenebis (ethylene urea) together with 0.5 part of a 0.5% aqueous solution of Aerosol OT (a product of American Cyanamid Co.) followed by further dispersion with a ball mill for 24 hours, the minute quantity still undispersed being filtered off with a shirting filter for viscose use.

To the filtrate was added one part of sodium alginate while stirring vigorously with a homomixer, following which the stirring was slackened and 5.5 parts of a "Gentac" brand latex (that containing 40% solids being used) were added whereby was obtained the first treatment liquor.

Using the Computreater of the C. A. Litzler Co., Inc., a polyethylene terephthalate tire cord was immersed in this first treatment liquor for three seconds followed by the simultaneous performance of drying and heating for three minutes at 220° C.

The second treatment liquor, i.e., the resorcinol-formaldehyde-latex aqueous dispersion comprised the following.

A liquor:                                           Parts
   Resorcinol _____ 22.2
   38% aqueous formaldehyde _____ 102.2
   10% NaOH _____ 11.0
   Water _____ 121.2

B liquor:
   40% "Gentac" brand latex _____ 311.5
   60% natural rubber latex _____ 53.3
   10% NaOH _____ 11.0
   Water _____ 470.2

After condensing the A liquor for six hours at 20° C., it was mixed with the B liquor and the mixed aqueous dispersion was aged for 24 hours at room temperature, thereby obtaining the second treatment liquor.

The cord after being immersed in the first treatment liquor and then heat-treated was, again using the Computreater immersed in the second treatment liquor for three seconds followed by drying and baking for one minute at 150° C.

This cord was buried in a 3 mm. thick unvulcanized natural rubber compounded for tire carcass, and the vulcanization and adhesion of the cord was effected by using a temperature of 136° C. and a pressure of 15 kg./cm.² for 50 minutes. When the static adhesive force of the rubber and cord was measured by an H-piece test, the results showed that it was greater than the strength of the cord which was ruptured at 13.0 kg.

A cord treated only with the first treatment liquor showed an adhesive force of 5.0 kg. and the adhesive force of a cord treated only with the second treatment liquor was merely 3.0 kg. The adhesive force of a cord which after being treated with the first treatment liquor was immersed in a 40% "Gentac" brand latex instead of the second treatment liquor and then heat treated and adhered, as described above, was 5.5 kg.

*Example 2*

5.0 parts of hexamethylenebis(ethylene urethane) and 0.5 part of a 0.5% aqueous solution of Aerosol OT were dispersed in 91 parts of water adjusted to pH 9.0 with caustic soda, and was further dispersed for 24 hours by means of a ball mill. The aqueous dispersion was filtered with a shirting filter for viscose use to filter off the still undispersed portion. To the filtrate so obtained 3.0 parts of natural rubber latex of 60% solids content and 0.5 part of sodium alginate were added whereby was obtained the first treatment liquor. After carrying out the remainder of the example with the other conditions as in Example 1, measurement of the adhesive force was performed by means of the H-piece pulling out test, and the result was that the adhesive force was greater than the strength of the cord which ruptured at 13.0 kg.

The adhesive force of the cord which was treated only with the first treatment liquor was 4.5 kg.

The adhesive force of the cord treated with, instead of the second treatment liquor, a latex (solids content of 30%) of a 90/10 polyvinyl chloride/vinyl acetate copolymer and with the other conditions as in Example 1 was 4.6 kg.

*Example 3*

Using as the first treatment liquor that comprising 3.0 parts of 2,4-tolylenebis(ethylene urea) dissolved in 97 parts of tetrahydrofurane, a polyethylene terephthalate cord was immersed therein for five seconds, following which it was heated for two minutes at 200° C.

The treatments with the second treatment liquor and thereafter were performed as in Example 1. When the adhesive force was measured by the H-piece test, the result showed that it was greater than the strength of the cord which ruptured at 13.0 kg.

The adhesive force of the card treated only with the first treatment liquor was 5.0 kg.

*Example 4*

Using as the first treatment liquor a liquor comprising 4.0 parts of hexamethylenebis(ethylene urethane) dispersed and dissolved in 96 parts of methyl ethyl ketone, a polyethylene terephthalate tire cord was immersed in this first treatment liquor for five seconds and thereafter heated for two minutes at 200° C.

The treatments with the second treatment liquor and thereafter were as in Example 1. When the adhesive force was measured by the H-piece test, the result was that it was greater than the strength of the cord which ruptured at 13.0 kg.

The cord treated only with the first treatment liquor had an adhesive force of 4.5 kg.

*Example 5*

Using the first treatment liquor of Example 1, an investigation was conducted as to the effects that a change in the heating temperatures employed during treatment with the first treatment liquor had on the adhesive force. The conditions of the subsequent treatments including the treatment with the second liquor were identical to Example 1.

The results were as follows:

| Heating temperature after treatment with first treatment liquor (° C.) | Time heated (min.) | Average adhesive force (kg.) | Remarks |
|---|---|---|---|
| 250 | 0.5 | 12.5 | Cord ruptured. |
| 230 | 1.0 | 13.0 | Do. |
| 220 | 1.0 | 12.0 | Cord of above 80% of sample ruptured. |
| 220 | 2.0 | 13.0 | Cord ruptured. |
| 220 | 3.0 | 13.0 | Do. |
| 180 | 2.0 | 12.0 | Cord of above 80% of sample ruptured. |
| 180 | 3.0 | 13.0 | Cord ruptured. |
| 150 | 5.0 | 11.0 | Cord of above 60% of sample ruptured. |
| 130 | 5.0 | 8.0 | All pull out. |
| 130 | 10.0 | 8.0 | Do. |

From the above results, it can be seen that after treatment with the first treatment liquor a heating temperature of 150–250° C. is desirable.

*Example 6*

In the first treatment liquor of Example 1 a polyethylene terephthalate cable cord prepared as described hereinbefore was immersed for five seconds and thereafter heat treated for three minutes at 220° C.

The resorcinol-formaldehyde-latex aqueous dispersion which is the second treatment liquor was prepared according to the following conditions.

A liquor:                                           Parts
   Resorcinol _____ 40
   37% aqueous formaldehyde _____ 60
   Water _____ 400

The mixed liquor was adjusted to pH 8.5 with caustic soda.

B liquor:                                           Parts
   Hycar brand 2508 FS 40% latex (a product of Nihon Zeon Co., Tokyo) _____ 350
   Natural rubber 60% latex _____ 50
   Water _____ 100

The mixed liquor was adjusted to pH 8.5 with caustic soda.

After condensing A liquor for six hours at 20° C., it was mixed with B liquor, and it was used after the mixture was aged for 24 hours at room temperature.

The cord whose heat treatment of the first treatment liquor had been completed was immersed in the second treatment liquor for three seconds, and the following experiment was performed in which the heat treatment temperatures were varied. Before testing, this cord was buried in the middle of a one cubic centimeter mold containing blended natural rubber for V-belt use and adhesion and vulcanization was effected for 50 minutes at a temperature of 136° C. and a pressure of 15 kg./cm.$^2$. When the adhesive forces were measured by the cubic test, the results were as follows:

| Heating temperature after treating with second treatment liquor (° C.) | Heating time (min.) | Adhesive force (kg.) |
|---|---|---|
| 100 | 5 | 21 |
| 130 | 2 | 33 |
| 130 | 3 | 38 |
| 130 | 5 | 34 |
| 160 | 1 | 26 |
| 160 | 2 | 40 |
| 160 | 3 | 40 |
| 160 | 5 | 39 |
| 200 | 1 | 22 |
| 200 | 2 | 33 |
| 200 | 3 | 33 |
| 200 | 5 | 29 |
| 220 | 1 | 26 |
| 220 | 2 | 34 |
| 220 | 3 | 34 |
| 220 | 5 | 26 |
| 230 | 2 | 36 |
| 250 | 1 | 20 |

*Example 7*

In order to investigate the relationships between the concentration in the first treatment liquor of the compound having the functional group and (*a*) the solid pick up of the first coating, and (*b*) the adhesive force, first treatment liquors with the following recipes in which the concentrations of the compound having the functional groups were varied were prepared, the quantities being parts by weight:

|  | First treatment liquor symbols ||||| 
|---|---|---|---|---|---|
|  | A | B | C | D | E |
| Hexamethylenebis (ethylene urea) | 1 | 2.5 | 4.0 | 5.5 | 7.0 |
| Aerosol OT 0.5% aqueous solution | 0.5 | 0.5 | 0.5 | 0.5 | 0.5 |
| Water adjusted to pH 9.0 | 97.0 | 95.5 | 94.0 | 92.5 | 91.0 |
| Sodium alginate | 0.5 | 0.5 | 0.5 | 0.5 | 0.5 |
| Gentac brand 40% latex | 1 | 1 | 1 | 1 | 1 |

Cable cords prepared as described hereinbefore were immersed in the respective above first treatment liquors for three seconds and thereafter heated for three minutes at 220° C.

Then the cable cords were immersed in the second treatment liquor as used in Example 1 for three seconds and baked for two minutes at 150° C., following which they were adhered to rubbers as in Example 6. Their adhesive forces were measured by a cubic test, while the solid pick up percentages (SPU) of the first treatment liquor on the surfaces of the cords were obtained from the bone dry weight increases in cord samples 3 meters in length by taking measurements before and after treatment with the first treatment liquors.

| Type first treatment liquor | Solid pick up of first treatment liquor (percent) | Adhesive force (kg.) |
|---|---|---|
| A | 0.21 | 31.5 |
| B | 0.52 | 40.0 |
| C | 1.15 | 42.7 |
| D | 1.87 | 42.1 |
| E | 2.61 | 42.0 |

From these results, it is observed that the solid pick up of the first coating increases linearly as the concentration in the first treatment liquor of the compound having the functional group is increased, and while the adhesive force increases at first, it gradually slackens and the existence of a critical point is noted. In this case, the existence of the critical point is noted when the concentration of the first treatment liquor is 2.5% and the solid pick up is 0.5%.

*Example 8*

0.3 part of hexamethylene diamine was added to the first treatment liquor of Example 1, and in this first treatment liquor a polyethylene terephthalate cable cord was immersed for three seconds, following which it was heated for two minutes at 220° C. Subsequent treatments were given as in Example 7.

This cord when tested by the cubic test had an adhesive force of 44 kg. When compared with the 40 kg. of that treated with a liquor to which amine was not added, there was noted a 10% increase in its adhesive force.

Moreover, when amine was added, the appearance of pick up spots that result from the second treatment liquor hardly ever occurs. In addition, it seemed that the cord following its treatment with the second treatment liquor showed an increase in its flexibility.

*Example 9*

A fabric woven from polyethylene terephthalate 250 de. 48 filament yarn and with the PVA size used for weaving still adhering was immersed for one minute in the first treatment liquor of Example 1, after which it was heated for five minutes at 220° C.

The fabric was then immersed for one minute in the second treatment of Example 1 followed by baking for three minutes at 150° C. Then its adhesion to a carcass-compounded natural rubber was effected, the time being 50 minutes, the temperature, 136° C. and pressure, 15 kg./cm.$^2$. When its adhesive force was measured, it was 13.0 kg. per 0.5 cm. width which was an adhesive force greater than the force required to rupture the rubber.

When the fabric was treated only with the first treatment liquor, the adhesive force per 3 cm. width was 4.5 kg. On the other hand, when, after treatment with the first treatment liquor, it was immersed in a 40% "Gentac" brand latex instead of the second treatment liquor followed by heating for three minutes at 150° C., its adhesive force was 2 kg. per 3 cm. width. Similarly, when a 60% natural rubber latex was used, it was 3 kg. per 3 cm. width; and when not treated with the first treatment liquor but only with the second treatment liquor, it was 3 kg. per 3 cm. width.

Furthermore, when the PVA was washed and removed by treating for 30 minutes in hot water of 80° C. to which had been added 2 g./l. of soapless soap, the results obtained were the same as above.

*Example 10*

A polyethylene terephthalate film (tear strength of 3.4 kg. per 1 cm. width and 20 micron thickness) was treated as in Example 9. When the adhesive force of the adhesion of the film to the rubber was measured by the stripping test, it was stronger than the strength of the film which ruptured at 3 kg. per 1 cm. of width.

In the case of a film treated only with the first treatment liquor its adhesion force to the rubber was 1 kg. per 1 cm. width, and when treated as in Example 9 by immersing in a natural rubber latex of 60% solids content instead of the second treatment liquor, its adhesion force to the rubber per 1 cm. width was 1 kg. On the other hand, when the film was not treated with the first treatment liquor but only with the second treatment liquor, the film would not adhere completely to the rubber.

*Example 11*

Staples 3 de. x 2" spun from polycyclohexane-1,4-dimethylol terephthalate were made into 30 counts two folded yarns and then woven into a tropical fabric, which was treated as in Example 9. When the adhesive force of the adhesion of this fabric to rubber was measured by the stripping test, it was greater than the strength of the rubber which ruptured at 12 kg. per 0.5 cm. width.

When the fabric was treated with only the first treatment liquor, or after treatment with the first treatment liquor was immersed in a 40% "Gentac" brand latex instead of the second treatment liquor, followed by heating for three minutes at 150° C., or was not treated with the first treatment liquor but with only the second treatment liquor, the adhesive force in each of these instances was about 3 kg. per 3 cm. width.

*Example 12*

The cord whose heat treatment of the first treatment liquor was completed and that whose heat treatment of the second treatment liquor was completed as in Example 1 were respectively investigated as to their changes with passage of time when exposed to the air in a room. The results are as follows:

| Time elapsed from completion 1st treatment liquor heat treatment to treatment with 2nd treatment liquor | Days elapsed from completion 2nd treatment liquor heat treatment to adhesion of cord to rubber | Adhesive force by H-piece test (kg.) | Rate of cord rupture (percent) |
|---|---|---|---|
| 1 day | 1 | 13.0 | 100 |
| 4 days | 1 | 13.0 | 100 |
| 1 week | 1 | 12.8 | 95 |
| 2 weeks | 1 | 13.0 | 100 |
| 1 month | 1 | 12.7 | 95 |
| 3 months | 1 | 12.8 | 90 |
| 1 year | 1 | 12.5 | 88 |
| 2 days | 1 | 13.0 | 100 |
| Do | 4 | 12.6 | 96 |
| Do | 7 | 11.0 | 72 |
| Do | 10 | 11.5 | 80 |
| Do | 14 | 11.8 | 84 |

From the above results it can be seen that, in a cord in which the formation of the first coating has been completed, changes resulting from being left standing in a room cannot be observed and also that, in a cord whose formations of the first and second coatings have been completed, changes resulting from being left standing in a room for about two weeks is a matter that hardly needs being taken into account in the usual commercial production operations.

Having thus described the invention, what is claimed is:

1. A method for the adhesion of a polyester material to a rubber compound selected from the group consisting of polymers of isoprene, polymers of butadiene and polymers of chloroprene which comprises the steps of treating said material with a first treatment liquor containing a compound of the formula

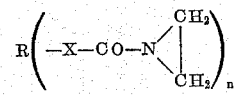

wherein X is selected from the group consisting of NH and O; R is a polyvalent organic radical free from active hydrogen; and $n$ is an integer of at least 2, heat-treating at temperatures between 150 and 250° C. the material treated with the first treatment liquor, treating the heat-treated material with a second treatment liquor comprising a phenol-formaldehyde-latex aqueous dispersion, heat-treating at temperatures between 100 and 250° C. the material treated with the second treatment liquor, and thereafter effecting the adhesion of the material to the rubber compound.

2. A method in accordance with claim 1, wherein the material treated with the first treatment liquor is heat treated at temperatures between 180 and 230° C.

3. A method in accordance with claim 1 wherein the second treatment liquor comprises a resorcinol-formaldehyde-latex aqueous dispersion.

4. A method for the adhesion of a polyester material to a rubber compound selected from the group consisting of polymers of isoprene, polymers of butadiene and polymers of chloroprene which comprises the steps of treating said material with an aqueous first treatment liquor containing a compound of the formula

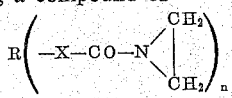

wherein X is selected from the group consisting of NH and O; R is a polyvalent organic radical free from active hydrogen; and $n$ is an integer of at least 2, heat-treating at temperatures between 150 and 250° C. the material treated with the first treatment liquor, treating the heat-treated material with a second treatment liquor comprising a phenol-formaldehyde-latex aqueous dispersion, heat-treating at temperatures between 100 and 250° C. the material treated with the second treatment liquor, and thereafter effecting the adhesion of the material to the rubber compound.

5. A method in accordance with claim 4 wherein the material treated with the first treatment liquor is heat-treated at temperatures between 180 and 230° C.

6. A method in accordance with claim 4 wherein the second treatment liquor comprises a resorcinol-formaldehyde-latex aqueous dispersion.

7. A method in accordance with claim 4 wherein the first treatment liquor contains an amine selected from the group consisting of the primary amines, secondary amines, tertiary amines, polymerized amino compounds and quaternary hydroxylammonium compounds in an amount of 0.05 to 4 equivalents of amine to one equivalent of said compound in said liquor.

8. A method in accordance with claim 4 wherein the first treatment liquor contains further a small quantitiy of a dispersing agent.

9. A method in accordance with claim 4 wherein the first treatment liquor contains further a small quantity of a viscosity controlling agent.

10. A method in accordance with claim 4 wherein the first treatment liquor contains further a small quantity of latex.

11. A method for the adhesion of a polyethylene terephthalate material to a rubber compound selected from the group consisting of polymers of isoprene, polymers of butadiene and polymers of chloroprene which comprises the steps of treating said material with an aqueous first treatment liquor containing a compound of the formula

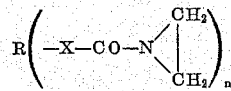

wherein X is selected from the group consisting of NH and O; R is a polyvalent organic radical free from active hydrogen; and $n$ is an integer of at least 2, heat-treating at temperatures between 180 and 230° C. the material treated with the first treatment liquor while allowing contraction of the material, treating the heat-treated material with a second treatment liquor comprising a resorcinol-formaldehyde-latex aqueous dispersion, heat treating at temperatures between 100 and 250° C. the material treated with the second treatment liquor, and thereafter effecting the adhesion of the material to the rubber compound.

References Cited by the Examiner

UNITED STATES PATENTS

| 2,733,261 | 1/56 | Seeger. |
| 2,826,526 | 3/58 | Meyrick et al. _____ 156—331 |
| 2,993,825 | 7/61 | Gage _____ 156—315 X |
| 3,051,594 | 8/62 | Aitken _____ 156—315 X |

FOREIGN PATENTS

| 1,172,978 | 10/58 | France. |
| 815,860 | 7/59 | Great Britain. |
| 816,640 | 7/59 | Great Britain. |

EARL M. BERGERT, *Primary Examiner.*